United States Patent
Mayer et al.

(10) Patent No.: US 11,301,249 B2
(45) Date of Patent: Apr. 12, 2022

(54) HANDLING EXCEPTIONS IN A PROGRAM

(71) Applicant: Infineon Technologies AG, Neubiberg (DE)

(72) Inventors: Albrecht Mayer, Deisenhofen (DE); Neil Stuart Hastie, Lydney (GB); Pawel Jewstafjew, Bradley Stoke (GB)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/678,215

(22) Filed: Nov. 8, 2019

(65) Prior Publication Data

US 2020/0150962 A1 May 14, 2020

(30) Foreign Application Priority Data

Nov. 9, 2018 (DE) .................. 10 2018 128 045.9

(51) Int. Cl.
*G06F 9/30* (2018.01)

(52) U.S. Cl.
CPC ...... *G06F 9/30072* (2013.01); *G06F 9/30043* (2013.01); *G06F 9/30076* (2013.01)

(58) Field of Classification Search
CPC ........... G06F 9/300072; G06F 9/30043; G06F 9/30076
See application file for complete search history.

(56) References Cited

U.S. PATENT DOCUMENTS

| | | | | | |
|---|---|---|---|---|---|
| 5,146,581 | A | * | 9/1992 | Kaneko | G06F 12/0623 711/5 |
| 5,182,811 | A | * | 1/1993 | Sakamura | G06F 9/4812 710/264 |
| 6,134,653 | A | * | 10/2000 | Roy | G06F 9/30076 712/228 |
| 6,202,127 | B1 | | 3/2001 | Dean | |
| 6,289,446 | B1 | * | 9/2001 | Nilsson | G06F 9/4484 712/244 |
| 6,308,319 | B1 | * | 10/2001 | Bush | G06F 8/458 707/999.202 |
| 6,314,510 | B1 | * | 11/2001 | Saulsbury | G06F 9/463 711/145 |
| 6,817,015 | B2 | * | 11/2004 | Takata | G06F 8/66 711/103 |
| 6,886,094 | B1 | * | 4/2005 | Blandy | G06F 9/30072 712/233 |
| 6,892,260 | B2 | * | 5/2005 | Burgess | G06F 9/30018 710/260 |
| 8,332,564 | B2 | * | 12/2012 | Matterne | G06F 13/124 710/310 |
| 9,342,429 | B1 | | 5/2016 | Serebrin | |
| 9,411,542 | B2 | * | 8/2016 | Higham | G06F 13/1668 |
| 2006/0282710 | A1 | | 12/2006 | Swoboda | |
| 2011/0167496 | A1 | * | 7/2011 | McPhail | G06F 21/72 726/24 |
| 2015/0213260 | A1 | * | 7/2015 | Park | G06F 12/14 726/23 |

* cited by examiner

*Primary Examiner* — Cheng Yuan Tseng
(74) *Attorney, Agent, or Firm* — Eschweiler & Potashnik, LLC

(57) ABSTRACT

Handling an exception includes (i) executing a return from an exception; and (ii) executing a subsequent instruction with an additional functionality in case the additional functionality of the subsequent instruction can be triggered by a special instruction.

15 Claims, 2 Drawing Sheets

US 11,301,249 B2

HANDLING EXCEPTIONS IN A PROGRAM

REFERENCE TO RELATED APPLICATION

This application claims priority to German Application No. 10 2018 128 045.9, filed on Nov. 9, 2018, the contents of which are hereby incorporated by reference in their entirety.

FIELD

The present disclosure relate to exception handling in a program.

BACKGROUND

A program may comprise several subsequent instructions that are usually processed by a CPU one after the other. However, an exception (e.g., an interrupt, a trap or a task switch) may occur any time so that the current sequence is interrupted, and the exception is executed. After the exception (an RFE (Return From Exception) instruction may be the last instruction of the exception), the previous sequence is continued.

SUMMARY

The disclosure is directed to improve existing exception handling solutions.

The examples suggested herein may in particular be based on at least one of the following solutions. Combinations of the following features may be utilized to reach a desired result. The features of the method could be combined with any feature(s) of the device, apparatus or system or vice versa.

A method is provided for handling exceptions comprising: executing a return from an exception, and executing a subsequent instruction with an additional functionality in case the additional functionality of the subsequent instruction can be triggered by a special instruction.

Hence, the special instruction and the subsequent instruction supply a combined instruction that (when combined) results in triggering an additional functionality (e.g., a trace functionality). The exception may result in separating both instructions thereby processing them as atomic instructions without any combined effect to trigger the additional functionality. Hence, in order not to lose the additional functionality to be triggered, the additional functionality for the subsequent instruction is always triggered after the return from an exception (of course, this only applies if there is any additional functionality available for the subsequent instruction).

According to an embodiment, the exception comprises at least one of the following: an interrupt, a trap, and a task change.

According to an embodiment, the return from an exception returns to the previously interrupted program.

According to an embodiment, the additional functionality is not triggered when the subsequent instruction is executed in a special execution mode.

According to an embodiment, the special execution mode is a secure execution mode.

According to an embodiment, the additional functionality comprises at least one of the following: a trace functionality, and a monitoring functionality.

According to an embodiment, the special instruction and the subsequent instructions are subsequent instructions of a program.

According to an embodiment, the special instruction is a NOP instruction.

According to an embodiment, the NOP instruction supports a selection between options for the additional functionality.

According to an embodiment, options for the additional functionality are selected via bits of the NOP instruction.

According to an embodiment, options for the additional functionality are as follows: no additional functionality, additional functionality for store instruction, additional functionality for load instruction, and additional functionality for store or load instruction.

According to an embodiment, the method is run on an operating system.

Also, a device is suggested for handling exceptions, which is configured to conduct the acts: executing a return from an exception, and executing a subsequent instruction with an additional functionality in case the additional functionality of the subsequent instruction can be triggered by a special instruction.

According to an embodiment, the device comprises at least one of the following: a processing device, a CPU, a monitoring unit, a chip, and a single-chip.

Also, a device is provided for handling exceptions, and comprises: means for executing a return from an exception, and means for executing a subsequent instruction with an additional functionality in case the additional functionality of the subsequent instruction can be triggered by a special instruction.

Further, a non-transitory computer program product or non-transitory computer readable storage medium is suggested, which is directly loadable into a memory of a digital processing device, comprising software code portions for performing the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

A program may comprise several subsequent instructions that are usually processed by a CPU one after the other. However, an exception (e.g., an interrupt, a trap or a task switch) may occur any time so that the current sequence is interrupted, and the exception is executed. After the exception (an RFE (Return From Exception) instruction may be the last instruction of the exception), the previous sequence is continued.

However, it is a problem if the exception occurs between instructions that have a combined meaning, also referred to herein as "additional functionality": If a first instruction (I0) triggers a functionality of a subsequent second instruction (I1), it needs to be ensured that such functionality happens even if an exception occurred between these instructions I0 and I1.

The instructions I0 and I1 may be defined as specific instruction types. A preemptive operating system (OS) could change a task during an interrupt routine (task switch) so that the instruction I1 may not even be executed directly after the interrupt service routine has ended. Instead, the instruction I1 may be executed later when it is changed back to the previous task (i.e. the task in which the instruction I0 was executed).

The problem in particular applies if a special instruction (special NOP "No Operation" instruction) is used to further qualify a subsequent instruction, which may be a store instruction: If such special instruction is used prior to the subsequent store instruction, a trace functionality may be triggered, i.e. data value and address are output via a trace interface. If the special instruction is missing, no trace functionality is triggered. Hence, the exception occurring between the instructions I0 and I1 may result in a missing trace functionality. This is especially cumbersome, because exceptions may occur at an arbitrary pattern leading to missing information on the trace interface.

As indicated above, if an interrupt (or trap) occurs after the special instruction, the effect of the special instruction (i.e. the trace functionality) might get lost, i.e. no additional functionality is triggered after the interrupt (or trap) has ended.

An interrupt service routine or a trap handler may comprise the RFE instruction as the last instruction.

Embodiments described herein in particular implement a rule that after the RFE instruction, the instruction I1 is (always) executed with its additional functionality.

Figure 1:
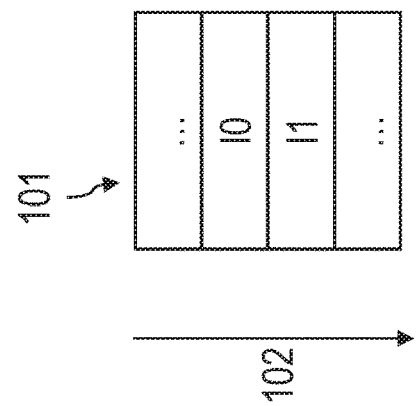
FIG. 1 shows an excerpt of a program comprising a set of instructions.

FIG. 1 shows a set of instructions 101 comprising the instructions I0 and I1. An arrow 102 indicates the succession of execution of the instructions 101.

The instruction I0 is assumed to be a special instruction indicating that in combination with the instruction I1 an additional functionality, e.g., a trace functionality, is triggered.

The execution is as follows: At some point, a program counter (not shown) points to the special instruction I0, which may be a NOP that allows a selection between different options (more details about the options selected by the NOP will be described below). If the instruction I1 is subsequent to the special instruction I0 the additional functionality is triggered, e.g., a trace functionality (or trace mode) is triggered (e.g., switched on). This only applies if the instruction I1 directly follows on the special instruction I0. Otherwise, the additional functionality is not triggered.

Figure 2:
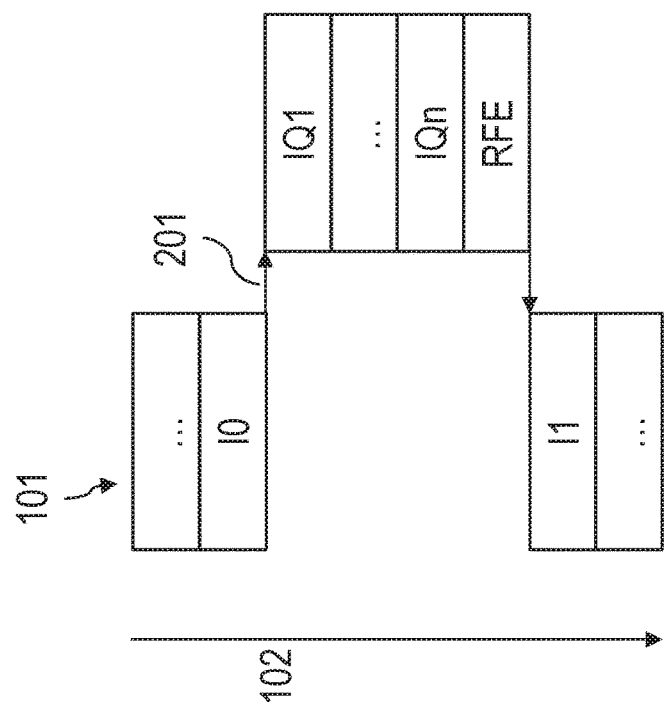
FIG. 2 shows the excerpt of the program of FIG. 1, wherein an interrupt occurred after the instruction I0 leading to a set of instructions of the interrupt before returning to processing the instruction I1.

FIG. 2 shows a different scenario, which is based on FIG. 1. In this example, an interrupt 201 occurs after the special instruction I0, leading to an execution of several instructions of the interrupt, i.e. instructions IQ1 to IQn. At the end of the interrupt routine an RFE instruction is executed and the previous task is continued by executing the instruction I1.

In this case, the instruction I1 would be executed without the special instruction I0 being its direct predecessor instruction. Due to the interrupt, the context of the special instruction I0 is lost and the additional functionality is not triggered for the instruction I1.

This can be efficiently avoided by triggering the additional functionality by default when the instruction I1 is executed after the RFE instruction (or any return from the exception). In this case, the trace functionality is triggered regardless of the special instruction I0 being the prior instruction before the interrupt.

An advantage of this approach is that the existence of the previous special instruction I0 does not have to be memorized across the exception, i.e. the processor or the system does not have to store the instruction that occurred before the interrupt in case it might be relevant when returning from the interrupt.

Even switching between tasks of an OS can be done without having to store the last special instruction I0 and to recall it before returning to the previous task.

Hence, the additional functionality is always triggered after the RFE instruction whether there was a special instruction I0 or not. This is nevertheless beneficial, because it leads to minor overhead based on the additional functionality, e.g., some more trace output than needed (better more information than less).

Figure 3:
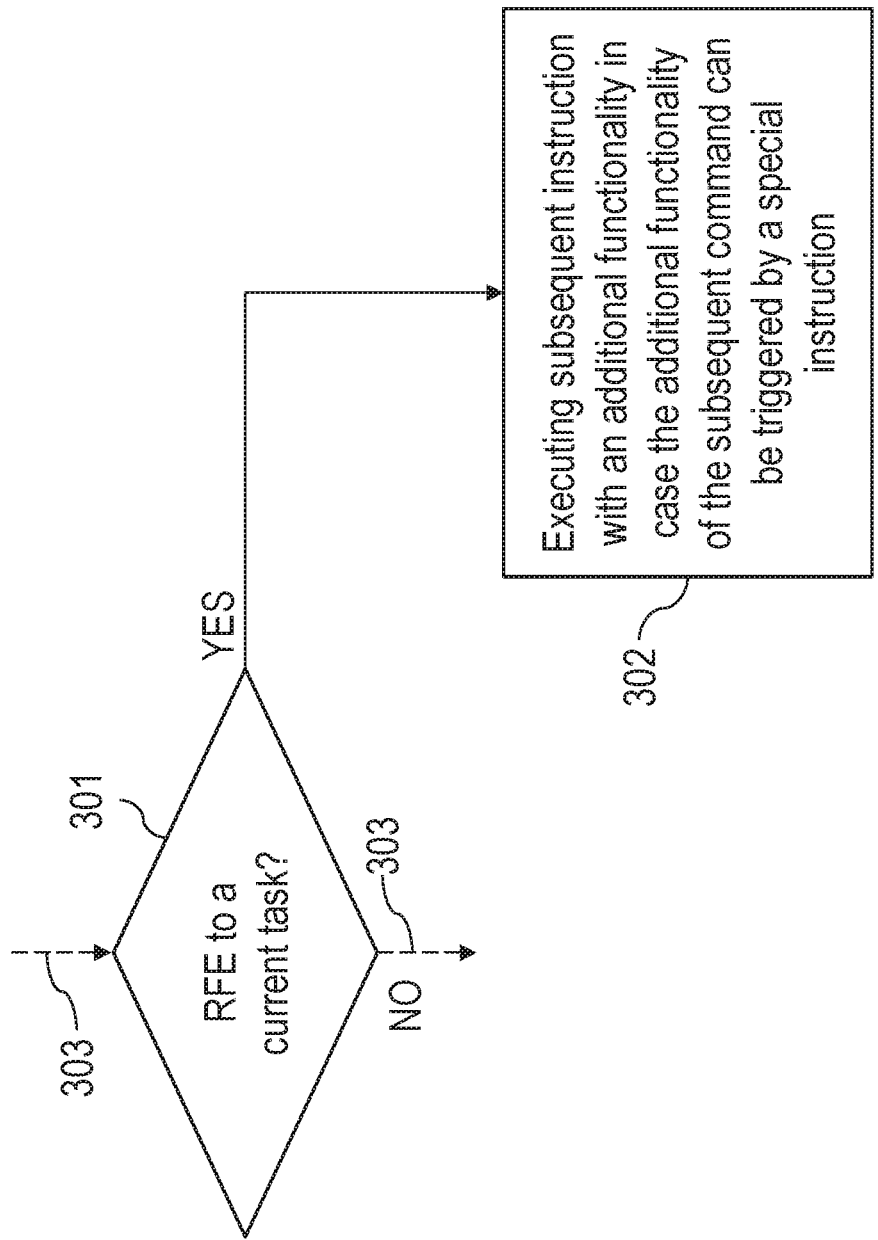
FIG. 3 shows a schematic diagram visualizing the steps to be processed when an RFE instruction is determined.

FIG. 3 shows an example diagram illustrating acts to conduct after a return from exception is determined. At 301, it is checked whether there is a return to the current task based on the RFE instruction. This can be implemented by the OS in a way that the subsequent act 302 is always executed in case an RFE instruction was issued. At 302 the subsequent instruction (in the example of FIG. 2, the instruction I1) is executed with an additional functionality. Of course, this may only apply if there is any additional functionality available for this subsequent instruction, which would normally be triggered by a special instruction (in the example of FIG. 2, the instruction I0). Hence, it is irrelevant whether or not the special instruction I0 was the last instruction before the exception; the instruction I1 is executed with the additional functionality anyway.

It is another option that the additional functionality is triggered (or not) depending on a status of a processor. This allows, e.g., preventing that secure data of a secret task is leaked. There are several states like a virtual machine, a task and/or a secure state of the processor which may or may not trigger (or prevent such trigger of) the additional functionality.

In addition, various operations may be conducted, if the check at 301 reveals that there is no RFE to the current task. For example, the code of the exception may be continued. The act 301 may thus be embedded in the code of the exception (indicated by the dashed lines 303).

Further Details on the Special Instruction

As an option, the special instruction (I0 in the examples shown above) may be a NOP (No Operation) instruction, which allows encoding different options.

Examples of such options might be as follows: One option is that there is no impact on the next instruction. Another option is that in case the next instruction is a store instruction, the address and the value stored are output via a trace interface of a CPU to a trace unit (which might be deployed on chip with the CPU) and further to, e.g., a trace-based measurement tool.

Accordingly, e.g., as a further option or as a portion of the option described above for the store instruction, in case the next instruction is a load instruction, the address and the value loaded are fed to the trace unit.

These options can be coded via single bits of the NOP instruction. For example, if an instruction has 16 bits, 12 bits may be used to identify the NOP instruction and 4 bits may not be used for the NOP instruction. These 4 bits may then be utilized to encode these options (4 bits can be used to encode $2^4=16$ options). This is comparable to 16 NOP instructions that are identified by 12 bits of the 16 bits, whereas the remaining bit are "DC" (don't care). However, this is only an example; the instruction may have more or less than 16 bits, etc.

Hence, after the RFE instruction, the trace output is always supplied for load instructions and/or store instructions. The bandwidth overhead that stems from any unwanted trace messages is limited: For instance, if there are 10 k interrupts/traps per second and on average every 10th instruction is a load or store instruction, there will be 1 k "I1 instructions after RFE instruction" events per second. This may result in an addition trace bandwidth amounting to less than 8 kByte/s, which may be negligible considering a real-world use case.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some respects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various example embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for handling exceptions, comprising:
   executing a return from an exception; and
   executing a subsequent instruction with an additional functionality after the return from the exception is executed when the additional functionality of the subsequent instruction can be triggered by a special instruction, wherein the special instruction and the subsequent instruction are two sequentially ordered instructions of a program unless interrupted by the exception.

2. The method according to claim 1, wherein the exception comprises at least one of the following:
   an interrupt;
   a trap; and
   a task change.

3. The method according to claim 1, wherein the return from an exception comprises a return to a previously interrupted program.

4. The method according to claim 1, wherein the additional functionality is not triggered when the subsequent instruction is executed in a special execution mode.

5. The method according to claim 4, wherein the special execution mode is a secure execution mode.

6. The method according to claim 1, wherein the additional functionality comprises at least one of the following:
   a trace functionality; and
   a monitoring functionality.

7. The method according to claim 1, wherein the special instruction is a No Operation (NOP) instruction.

8. The method according to claim 7, wherein the NOP instruction supports a selection between options for the additional functionality.

9. The method according to claim 8, wherein options for the additional functionality are selected via bits of the NOP instruction.

10. The method according to claim 8, wherein options for the additional functionality are as follows:
no additional functionality;
additional functionality for store instruction;
additional functionality for load instruction; and
additional functionality for store or load instruction.

11. The method according to claim 1, which is run on an operating system.

12. A device for handling exceptions in conjunction with a memory storing instructions therein, the device, upon executing the stored instructions configured to:
execute a return from an exception; and
execute a subsequent instruction with an additional functionality after the return from the exception is executed when the additional functionality of the subsequent instruction can be triggered by a special instruction, wherein the special instruction and the subsequent instruction are two sequentially ordered instructions of a program unless interrupted by the exception.

13. The device according to claim 12, wherein the device comprises at least one of the following:
a processing device;
a CPU;
a monitoring unit;
a chip; and
a single-chip.

14. A device for handling exceptions, comprising:
means for executing a return from an exception; and
means for executing a subsequent instruction with an additional functionality after the return from the exception is executed when the additional functionality of the subsequent instruction can be triggered by a special instruction, wherein the special instruction and the subsequent instruction are two sequentially ordered instructions of a program unless interrupted by the exception.

15. A non-transitory computer program product directly loadable into a memory of a digital processing device, comprising software code portions for performing acts of a method, comprising:
executing a return from an exception; and
executing a subsequent instruction with an additional functionality after the return from the exception is executed when the additional functionality of the subsequent instruction can be triggered by a special instruction, wherein the special instruction and the subsequent instruction are two sequentially ordered instructions of a program unless interrupted by the exception.

* * * * *